(12) United States Patent
Sandmeier

(10) Patent No.: US 8,413,973 B2
(45) Date of Patent: Apr. 9, 2013

(54) CLAMPING FIXTURE

(75) Inventor: Bruno Sandmeier, Birrwil (CH)

(73) Assignee: Erowa AG, Reinach (CH)

( * ) Notice: Subject to any disclaimer, the term of this patent is extended or adjusted under 35 U.S.C. 154(b) by 1243 days.

(21) Appl. No.: 12/199,999

(22) Filed: Aug. 28, 2008

(65) Prior Publication Data

US 2010/0019428 A1      Jan. 28, 2010

(30) Foreign Application Priority Data

Jul. 22, 2008   (CH) ...................................... 1144/08

(51) Int. Cl.
    *B25B 11/00* (2006.01)
(52) U.S. Cl.
    USPC ................. 269/309; 269/310; 269/289 R
(58) Field of Classification Search .......... 269/309–310, 269/900, 289 R
    See application file for complete search history.

(56) References Cited

U.S. PATENT DOCUMENTS

| | | | |
|---|---|---|---|
| 4,615,688 A | 10/1986 | Schneider | |
| 5,065,991 A * | 11/1991 | Schneider | 269/309 |
| 5,415,384 A * | 5/1995 | Obrist et al. | 269/309 |
| 7,367,552 B2 * | 5/2008 | Greber | 269/309 |
| 8,079,569 B2 * | 12/2011 | Lesko | 254/344 |
| 2003/0071407 A1 * | 4/2003 | Haruna | 269/309 |
| 2006/0226591 A1 * | 10/2006 | Yonezawa et al. | 269/309 |
| 2010/0019428 A1 * | 1/2010 | Sandmeier | 269/168 |
| 2011/0278516 A1 * | 11/2011 | Christian | 254/91 |

\* cited by examiner

*Primary Examiner* — Lee D Wilson
(74) *Attorney, Agent, or Firm* — Maginot, Moore & Beck, LLP

(57) ABSTRACT

The clamping fixture comprises a chuck (1) and fixedly securable thereto releasably a clamping pallet (6). The chuck (1) is provided with four centering pins (3) arranged at the chuck (1) cooperating with centering openings (9) arranged at the clamping pallet (6) such that the clamping pallet (6) when chucked in the chuck (1) is oriented in the X and Y direction. Each centering pin (3) features two conically tapered side faces (3a, 3b) whilst each centering opening (9) is defined by two side walls (9a, 9b) oriented parallel to each other. When chucking the clamping pallet (6) at the chuck (1) the conically tapered side faces (3a, 3b) of each centering pin (3) come into line contact with the sidewalls of the centering opening (9).

20 Claims, 2 Drawing Sheets

CLAMPING FIXTURE

BACKGROUND

The present invention relates to a clamping fixture.

Such clamping fixtures are put to use for chucking tools, workpieces or workpiece pallets positionally defined, the chuck usually being fixedly located on a work table of a machine tool or a press whilst the workpiece pallet is repeatedly releasably located precisely positioned at the chuck.

Known from EP 0 111 092 B2 is a coupling device for rotatably connecting replaceable a workpiece to a machining apparatus. The device comprises two coaxial centering members sandwiching a driving plate. The one coupling member is provided with a round centrically arranged driving pin as well as an elongated eccentrically arranged driving pin. The centrically arranged driving pin comprises a shell surface in the shape of a truncated cone whilst the eccentrically arranged driving pin features to each other side faces oriented radius parallel inclined to the axis of rotation of the coupling member. The driving plate features a centric circular opening as well as an eccentrically arranged substantially oval opening, each opening corresponding in shape and location to the corresponding driving pin. Arranged on one coupling member are three beads the surfaces of which protrude from the cross-section contacting the surface of the other coupling member when the coupling device is clamped. The driving plate is made of spring steel, the openings machined therein being oriented to correspond with the two driving pins such that the driving plate is axially elastically deformed in the region of the openings when the coupling device is clamped.

SUMMARY

The invention is aimed at sophisticating a clamping fixture having a chuck and a clamping pallet releasably secured thereto such that the clamping fixture is practically immune to dirt, the clamping pallet permits repeated precision location at the chuck and the centering members are simple and cost-effective to make.

For this purpose a clamping fixture in accordance with one embodiment of the invention is characterized in that the clamping fixture comprises at least three centering openings and a corresponding number of centering pins, each of the centering pins featuring two conically tapered side faces and each centering opening being defined by two side walls oriented parallel to each other configured such that the conically tapered side faces of each centering pin come into contact therewith linearly.

Preferred embodiments and further aspects of the subject matter of the invention include: the clamping fixture including four centering openings and a corresponding number of centering pins; the centering openings are machined in a one-piece centering plate, the latter being flexible compliant at least in the region of the centering openings in the Z direction; the centering plate being secured by means of studs to a base body of the clamping pallet; the studs being screwed into the base body of the clamping pallet and the front end of each stud forming a Z stop for abutting the chuck; each centering opening being defined sideways by a side walls flexibly compliant in the Z direction; the centering plate being made of a stainless sheet metal; the centering plate being made of a softer material than that of the centering pins; the centering openings being cut out from the centering plate by precision stamping; the centering plate being maximally 2 mm, and particularly 0.8 to 1.5 mm thick; the side faces of the centering pins being machined, and particularly ground with high precision; the centering members being arranged uniformly distributed on a circle; the clamping pallet being spaced away from its front end with a centering plate and provided with four centering openings, each centering opening being enclosed on all sides by the centering plate; the chuck being provided with a base body featuring flats for abutting the studs; and the centering plate (8) being secured to a base body of the clamping pallet by means of four threaded studs, the front end of each stud forming a Z stop for abutting against the chuck.

To ensure that the clamping pallet is chucked positioned with high absolute repeatable accuracy at least three pairs of centering members are provided which cooperate such that the clamping pallet is positioned relative to the chuck in the X and Y direction as well as relative to the angular position about the Z axis, resulting in the line contact of the side faces of the centering pins with the sidewalls of each centering opening, rendering the fixture practically immune to becoming dirty.

To achieve high stability in the chucked clamping pallet four spacer pins are preferably provided, located relatively far outwardly.

In another aspect of the invention, a clamping pallet for use in a clamping fixture is configured such that the clamping pallet includes a base body to which a one-piece centering plate configured with at least three centering openings is secured such that it is flexible compliant in the Z direction in the region of the centering openings, and may be characterized in that the clamping pallet (6) is configured as a workpiece pallet.

In another aspect of the invention, a centering plate may be provided for use in the clamping fixture by being particularly preferred for attachment to a base body of a clamping pallet. Preferred further aspects of the centering plate include: the centering plate being provided with four centering openings arranged on a circle, each spaced away from the other by 90°, and each centering opening being defined sideways by two side walls oriented parallel to each other; a fastener drilling machined in the centering plate between each two adjacent centering openings; and the centering openings being produced by precision stamping.

DESCRIPTION OF THE FIGURES

A preferred example embodiment of the clamping fixture in accordance with the invention will now be described with reference to the drawings in which.

DESCRIPTION OF THE EMBODIMENTS

Figure 1:
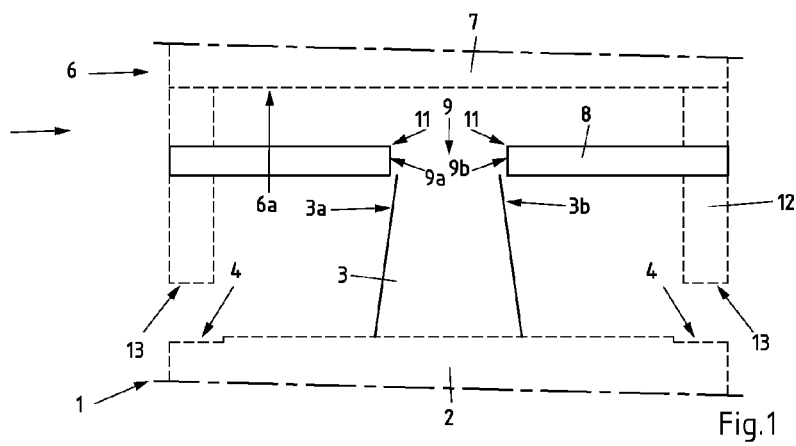
FIG. 1 is a diagammatic illustration of the clamping fixture during centering.

Referring now to FIG. 1 there is illustrated the clamping fixture in a diagammatic cross-section to assist in detaining how the centering members work. The clamping fixture comprises a chuck 1 and a clamping pallet 6. The chuck 1 features a mechanism for chucking a clamping pin arranged at the clamping pallet 6, the clamping means required for this purpose not being shown. The clamping pallet 6 serves in general to mount workpieces or tools at the chuck 1 repeatably precisely positioned. Both the chuck 1 and the clamping pallet 6 are provided with a solid base body 2, 7. The chuck 1 features first centering members in he form of centering pins 3 whilst the clamping pallet 6 features further centering members in the form of centering openings 9. It is understood that although only one centering pin 3 and one centering opening 9 are evident in the present example, the chuck 1 is usually provided with four centering pins 3 and the clamping pallet 6 with a corresponding number of centering openings 9.

In the present example the centering openings 9 are machined in a centering plate 8 the function of which is detained below. By means of studs 12 the centering plate 8 is located spaced away from the frontal face 6a of the base body 7 of the clamping pallet 6 such that the centering plate 8 is deflectable in the direction of the base body 7. The front end 13 of each stud 12 forms a Z stop for the clamping pallet 6. The base body 2 of the chuck 1 is provided with flats 4 for abutting the front end 13 of the studs 12. Each centering pin 3 is provided with two conically tapered side faces 3a, 3b contacting the side walls 9a, 9b of the centering plate 8 defining each centering opening 9 sideways. The centering pins 3 are made of a harder material than that of the centering plate 8. This has the advantage that wear of the side faces 3a, 3b of the centering pins 3 is minimized so that even after a high number of clamping actions the positioning accuracy is still not detrimented. Any wear of the side walls 9a, 9b of the centering plate 8 merely results in the face-line-contact with the centering pins 3 becoming somewhat wider which has no appreciable effect on the positioning accuracy.

Figure 2:
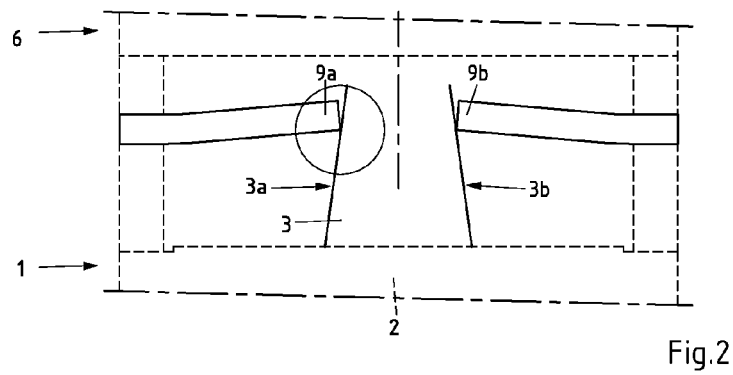
FIG. 2 is again a diagammatic illustration of the clamping fixture as shown in FIG. 1 but after centering.

Referring now to FIG. 2 there is illustrated the chuck 1 together with the clamping pallet 6 defined thereby. When chucking the clamping pallet 6 in the chuck 1 each centering pin 3 enters the corresponding centering opening 9, the side faces 3a, 3b of the centering pins 3 coming into contact with the side walls 9a, 9b of the centering plate 8 defining the centering openings 9 and resulting in the centering pins 3 and clamping pallet 6 respectively being oriented relative to the chuck 1. By four centering pins 3 and a corresponding number of centering openings 9 being provided the clamping pallet 6 is oriented in the X and Y direction as well as angularly about the Z axis when chucked in the chuck 1.

Figure 2A:
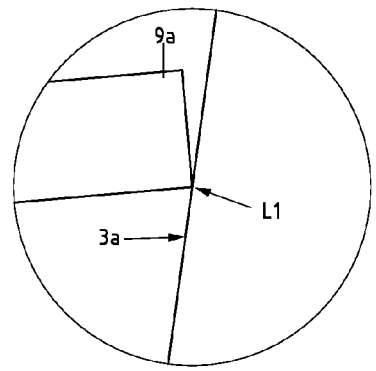
FIG. 2*a* is a detail on a magnified scale taken from FIG. 2.

In the condition as shown in which the two conically tapered side faces 3a, 3b of the centering pins 3 come into contact with the side walls 9a, 9b of the centering plate 8 defining the centering openings 9 sideways, line contact is achieved between each centering pin 3 and each side wall 9a, 9b. For this purpose the centering pins 3 are dimensioned so that the centering plate 8 is slightly deflected by each centering pin 3 in the direction of the base body of the clamping pallet 6 before the studs 12 abut the flats 4 of the chuck 1 by their front end 13. Referring now to FIG. 2a there is illustrated in a cross-section on a magnified scale how a side face 3a of the centering pin 3 abuts the side wall 9a of the centering plate 8 defining the opening sideways. As evident in cross-section a punctiform contact materializes between the side face 3a of the centering pin 3 and the side wall 9a of the centering opening 9.

Figure 2B:
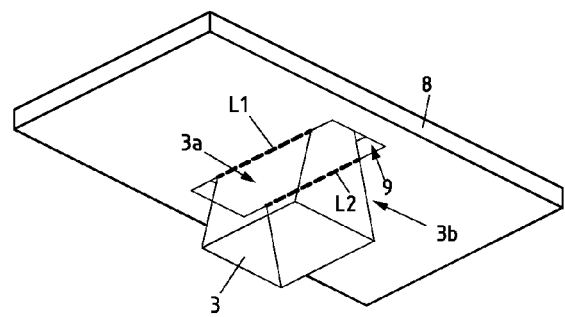
FIG. 2*b* is a view in perspective of two centering members.

Referring now to FIG. 2b there is illustrated in a view in perspective the centering pin 3 engaging a centering opening 9, the line contact between the base body 2 and the walls defining the centering openings 9 sideways being indicated by the cross-hatched lines L1, L2. Such a line contact—unlike a face contact—has the advantage that the centering members 3, 9 are practically immune to becoming dirty because of a high face loading causing any dirt to be scraped or forced away on insertion of the centering pins 3 into the centering openings 9. But, in any case, it is in this way that a high absolute and also repeatable accuracy is achieved every time the centering pin 3 is centered in the centering opening 9 and thus of the clamping pallet 6 relative to the chuck 1. The centering plate 8 is preferably made of a stainless sheet metal, the centering openings 9 preferably being machined by precision stamping. The thickness of the centering plate 8 is in the range of approx. 0.8 to 1.5 mm. Such a centering plate 8 is relatively cost-effective in production, the side faces 3a, 3b of the centering pins 3 being machined, particularly ground, with high precision.

Figure 3:
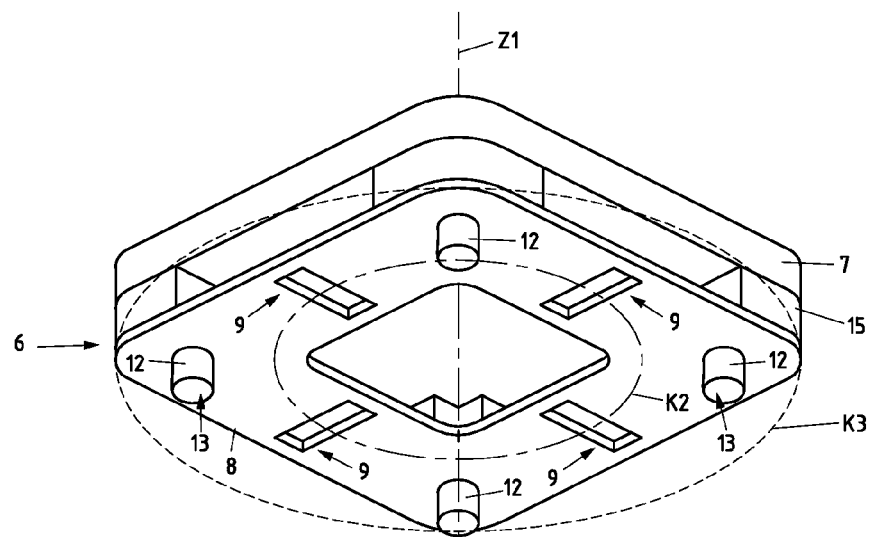
FIG. 3 is a diagrmmatic illustration of the clamping fixture consisting of a chuck and a clamping pallet.

Referring now to FIG. 3 there is illustrated a preferred embodiment of the clamping fixture consisting of the chuck 1 and the clamping pallet 6 for secure clamping thereto. The chuck comprises a cylindrical base body 2 mounting four centering pins 3 extending in the Z direction. Both the four centering pins 3 and the four centering openings 9 are arranged on a circle K1, K2 each spaced away from each other by 90°, it being evident how each centering opening 9 is enclosed on all sides by the centering plate 8. For chucking a clamping pin arranged on the clamping pallet 6 the chuck 1 usually features a chucking mechanism, neither this nor the clamping pin being evident in this FIG. Machined in the surface of the base body 2 are flats 4 for supporting the studs 12 by their face end.

The clamping pallet 6 comprises a centering plate 8 secured to the base body 7 by means of spacers 15. The spacers 15 may be configured as separate elements secured to the base body 7. As an alternative they may be engineered integral with the base body 7. In a further alternative the base body 7 is provided with a substantially flat face machined recessed only in the region of each centering opening 9.

Actual fastening of the centering plate 8 is done by means of studs 12, the face end of which serves to stop the clamping pallet 6. The studs 12 are preferably provided with a rear thread by means of which they can be fixedly located in a female thread of each spacer 15 and base body 7 respectively. The studs 12 are located relatively far outwardly to attain high stability of the clamping pallet 6 clamped in the chuck 1. Preferably the studs 12 are arranged in the outer quarter of a virtual circle K3 located at the radially outermost points of the clamping pallet 6.

The longitudinal centerlines of the centering pins 3 as well as of the centering openings 9 are oriented radius parallel to the Z axis Z1 of the chuck 1 and clamping pallet 6 respectively. In any case, this arrangement of the centering members 3, 9 permits repeatedly precise positioning of the clamping pallet 6 relative to the chuck 1 in the X and Y direction as well as relative to the angular position about the Z axis. In addition to this, providing the studs 12 as described in contact with the flats 4 of the chuck 1 also achieves high precise positioning in the Z direction.

Figure 4:
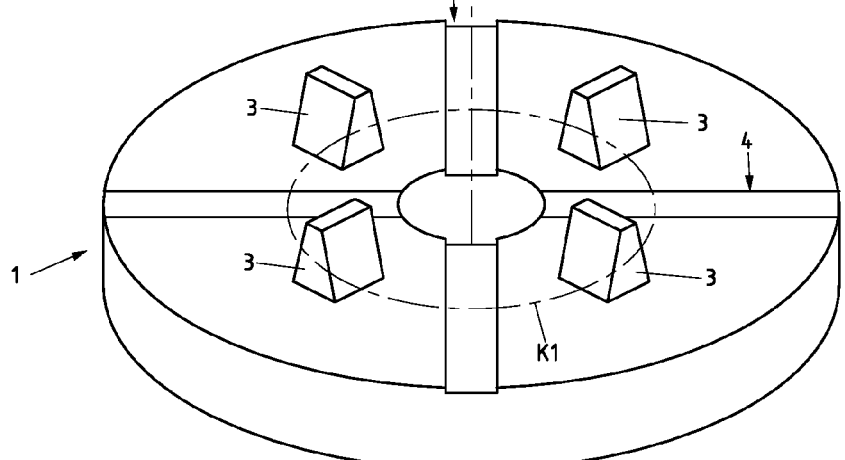
FIG. 4 is an illustration of a centering plate as a preferred example embodiment.
Figure 4:
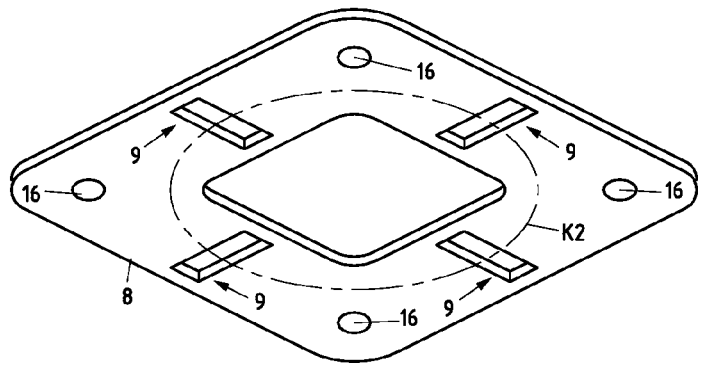

Referring now to FIG. 4 there is illustrated the centering plate 8 engineered integrally. For securing the centering plate 8 by means of the studs a fastener drilling 16 in the centering plate 8 is provided in the middle between two adjacent centering openings 9.

The invention claimed is:

1. A clamping fixture comprising a chuck (1) for chucking a clamping pallet (6), with first centering members (3) arranged at the chuck (1) cooperating with second centering members (9) arranged at the clamping pallet (6) such that the clamping pallet (6) when chucked in the chuck (1) is oriented in the X and Y direction, the first centering members being formed by centering pins (3) devised to engage the second centering members configured as centering openings (9), characterized in that:

the clamping fixture comprises at least three centering openings (9) and a corresponding number of centering pins (3), each of the centering pins (3) featuring two opposite side faces (3a, 3b) tapered toward each other and each centering opening (9) being defined by two side walls (9a, 9b) oriented parallel to each other configured such that the conically tapered side faces (3a, 3b) of each centering pin (3) come into contact therewith linearly; and the centering openings (9) are machined in a one-piece centering plate (8), the latter being flexibly compliant at least in the region of the centering openings (9) in the Z direction.

2. The clamping fixture as set forth in claim 1, characterized in that the clamping fixture comprises four centering openings (9) and a corresponding number of centering pins (3).

3. The clamping fixture as set forth in claim 1, characterized in that the centering plate (8) is secured by means of studs (12) to a base body (7) of the clamping pallet (6).

4. A clamping fixture comprising:
a clamping pallet (6) including a base body (7);
a chuck (1) for chucking the clamping pallet (6);
first centering members (3) arranged at the chuck (1) cooperating with second centering members (9) arranged at the clamping pallet (6) such that the clamping pallet (6) when chucked in the chuck (1) is oriented in the X and Y direction,
the first centering members being formed by at least three centering pins (3) devised to engage the second centering members configured as a corresponding number of centering openings (9),
each of the centering pins (3) featuring two conically tapered side faces (3a, 3b) and each centering opening (9) being defined by two side walls (9a, 9b) oriented parallel to each other configured such that the conically tapered side faces (3a, 3b) of each centering pin (3) come into contact therewith linearly,
wherein the centering openings (9) are machined in a one-piece centering plate (8) that is flexibly compliant at least in the region of the centering openings (9) in the Z direction,
wherein the centering plate (8) is secured by means of studs (12) to the base body (7) of the clamping pallet (6), characterized in that the studs (12) are provided with a thread and are screwed into the base body (7) of the clamping pallet (6) and that the front end (13) of each stud (12) forms a Z stop for abutting the chuck (1).

5. A clamping fixture comprising:
a clamping pallet (6);
a chuck (1) for chucking the clamping pallet (6);
first centering members (3) arranged at the chuck (1) cooperating with second centering members (9) arranged at the clamping pallet (6) such that the clamping pallet (6) when chucked in the chuck (1) is oriented in the X and Y direction,
the first centering members being formed by at least three centering pins (3) devised to engage the second centering members configured as a corresponding number of centering openings (9),
each of the centering pins (3) featuring two conically tapered side faces (3a, 3b) and each centering opening (9) being defined by two side walls (9a, 9b) oriented parallel to each other configured such that the conically tapered side faces (3a, 3b) of each centering pin (3) come into contact therewith linearly,
wherein the centering openings (9) are machined in a one-piece centering plate (8) that is flexibly compliant at least in the region of the centering openings (9) in the Z direction, and
further wherein each centering opening (9) is defined sideways by side walls (9a, 9b) that are flexibly compliant in the Z direction.

6. The clamping fixture as set forth in claim 1, characterized in that the centering plate (8) is made of a stainless sheet metal.

7. The clamping fixture as set forth in claim 1, characterized in that the centering plate (8) is made of a softer material than that of the centering pins (3).

8. The clamping fixture as set forth in claim 1, characterized in that the centering openings (9) are cut out from the centering plate (8) by precision stamping.

9. The clamping fixture as set forth in claim 1, characterized in that the centering plate (8) is maximally 2 mm, particularly 0.8 to 1.5 mm thick.

10. The clamping fixture as set forth in claim 1, characterized in that the side faces (3a, 3b) of the centering pins (3) are machined, particularly ground with high precision.

11. The clamping fixture as set forth in claim 1, characterized in that the first and second centering members (3, 9) are arranged uniformly distributed on a circle (K1, K2).

12. The clamping fixture as set forth in claim 1, characterized in that the clamping pallet (6) is provided spaced away from its front end with a centering plate (8) provided with four centering openings (9), each centering opening (9) being enclosed on all sides by the centering plate (8).

13. The clamping fixture as set forth in claim 4, characterized in that the chuck (1) is provided with a base body (2) featuring flats (4) for abutting the studs 12.

14. A clamping fixture comprising:
a clamping pallet (6) including a base body (7);
a chuck (1) for chucking the clamping pallet (6);
first centering members (3) arranged at the chuck (1) cooperating with second centering members (9) arranged at the clamping pallet (6) such that the clamping pallet (6) when chucked in the chuck (1) is oriented in the X and Y direction,
the first centering members being formed by at least three centering pins (3) devised to engage the second centering members configured as a corresponding number of centering openings (9),
each of the centering pins (3) featuring two conically tapered side faces (3a, 3b) and each centering opening (9) being defined by two side walls (9a, 9b) oriented parallel to each other configured such that the conically tapered side faces (3a, 3b) of each centering pin (3) come into contact therewith linearly,
characterized in that the centering plate (8) is secured to the base body (7) of the clamping pallet (6) by four threaded studs (12), the front end (13) of each stud (12) forming a Z stop for abutting against the chuck (1).

15. A clamping fixture comprising a chuck (1) for chucking a clamping pallet (6), with first centering members (3) arranged at the chuck (1) cooperating with second centering members (9) arranged at the clamping pallet (6) such that the clamping pallet (6) when chucked in the chuck (1) is oriented in the X and Y direction, the first centering members being formed by centering pins (3) devised to engage the second centering members configured as centering openings (9), characterized in that:
the clamping fixture comprises at least three centering openings (9) and a corresponding number of centering pins (3), each of the centering pins (3) featuring two opposite side faces (3a, 3b) tapered toward each other and each centering opening (9) being defined by two side walls (9a, 9b) oriented parallel to each other configured such that the conically tapered side faces (3a, 3b) of each centering pin (3) come into contact therewith linearly; and the clamping pallet (6) comprises a base body (7) to which a one-piece centering plate (8) configured with at least three centering openings (9) is secured such that it is flexible compliant in the Z direction in the region of the centering openings (9).

16. The clamping fixture as set forth in claim 15, characterized in that the clamping pallet (6) is configured as a workpiece pallet.

17. A centering plate (8) for attachment to a base body (7) of a clamping pallet (6) for use in a clamping fixture as set forth in claim 1, characterized in that the centering plate (8) is configured in one piece and comprises at least three centering openings (9) and that it features at least three drillings for securing to a base body (7) of a clamping pallet (6).

18. The centering plate (8) as set forth in claim 17, characterized in that the centering plate (8) is provided with four centering openings (9) arranged on a circle (K2) each spaced away from the other by 90°, each centering opening (9) being defined sideways by two side walls (9a, 9b) oriented parallel to each other.

19. The centering plate (8) as set forth in claim 17, characterized in that machined in the centering plate (8) between each two adjacent centering openings (9) is a fastener drilling (16).

20. The centering plate (8) as set forth in claim 17, characterized in that the centering openings (9) are produced by precision stamping.

* * * * *